United States Patent [19]

Nagl et al.

[11] Patent Number: 4,730,369
[45] Date of Patent: Mar. 15, 1988

[54] METHOD AND APPARATUS FOR MELTING AND RECOVERING SULFUR IN AQUEOUS SLURRIES

[75] Inventors: Gary J. Nagl, Hoffman Estates; Leslie C. Hardison, Barrington, both of Ill.

[73] Assignee: ARI Technologies, Inc., Palatine, Ill.

[21] Appl. No.: 874,869

[22] Filed: Jun. 16, 1986

[51] Int. Cl.$^4$ ............................................. C01B 17/027
[52] U.S. Cl. ................................. 23/293 S; 23/308 S; 422/110; 422/285; 423/578 R
[58] Field of Search .................... 422/106, 110, 285; 23/293 S, 308 S; 165/117, 118; 210/187, 773; 423/578 R

[56] References Cited

U.S. PATENT DOCUMENTS

| | | | |
|---|---|---|---|
| 2,181,687 | 11/1939 | Walker | 210/187 |
| 3,689,229 | 9/1972 | Lane et al. | 23/293 S |
| 3,832,145 | 8/1974 | Ellithorpe et al. | 422/106 |

FOREIGN PATENT DOCUMENTS 498790 9/1954 Italy .................................. 23/308 S Primary Examiner—David L. Lacey
Attorney, Agent, or Firm—Marshall, O'Toole, Gerstein, Murray & Bicknell

[57] ABSTRACT

Method and apparatus for recovering sulfur from an aqueous slurry. The slurry is passed downwardly through a shell-and-tube heat exchanger having vertically arranged tubes, wherein it is heated sufficiently to melt the sulfur. The liquid mixture leaving the heat exchanger is discharged into a first separation zone, in which a phase separation between the lighter aqueous phase and the denser liquid sulfur occurs. The upper aqueous phase is then transported to an intermediate point in the height of a vertically elongated second separation zone, while the molten sulfur is transported from the lower end of the first separation zone to a point adjacent the lower end of said second separation zone, in whch an interface between the phases is maintained at a point below the entry point of the aqueous liquid phase into the second separation zone. The aqueous liquid is discharged from the top of the second separation zone, while molten sulfur is discharged from the bottom of said zone.

4 Claims, 1 Drawing Figure

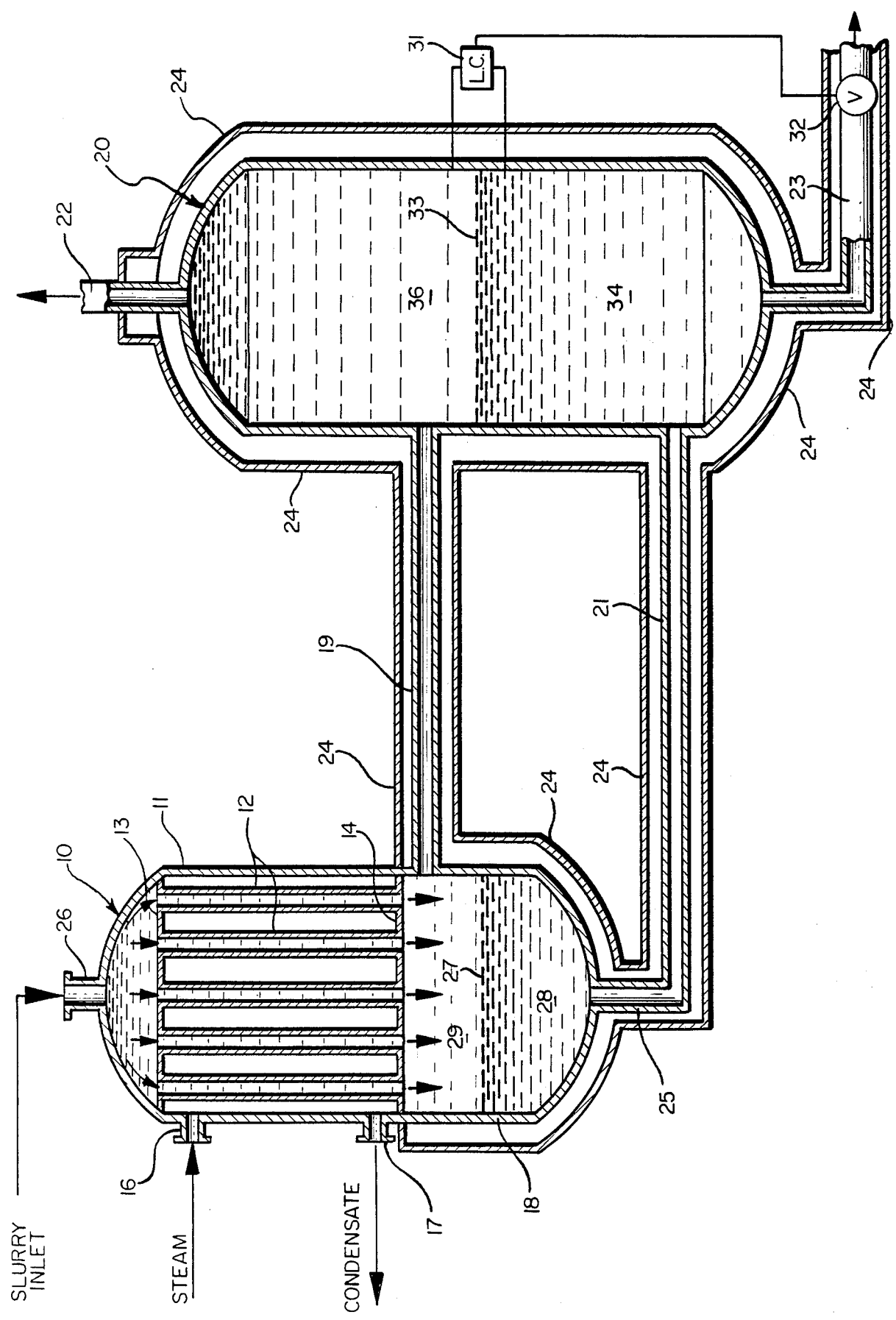

METHOD AND APPARATUS FOR MELTING AND RECOVERING SULFUR IN AQUEOUS SLURRIES

The present invention relates to an improved method and apparatus for melting finely divided sulfur particles suspended as a slurry in an aqueous liquid and for separating the molten sulfur from the aqueous liquid.

BACKGROUND OF THE INVENTION

In certain known processes for removing hydrogen sulfide from gas streams, the hydrogen sulfide is removed by absorption in an aqueous solution of a catalytic reagent, such as a vanadium compound or an iron chelate. The reagent effects oxidation of the hydrogen sulfide to solid sulfur, which precipitates in the aqueous liquid. In continuous operation of such processes, the solid sulfur must be separated from the reagent solution.

Although the separation of the solid sulfur from the reagent can be carried out in any appropriate manner, e.g., by filtration or centrifuging, it is preferred when producing large amounts of sulfur to concentrate the sulfur into a slurry containing 15–20% by weight of sulfur, and to pass the slurry through a melter in which the sulfur is melted, following which the molten sulfur is removed from the aqueous liquid by gravity phase separation. This method of separation has several advantages over other methods, e.g., filtration, in that it minimizes the loss of catalytic reagent which would otherwise occur in the moist filter cake, and in addition, facilitates handling of large quantities of sulfur product.

Prior methods for liquefying sulfur in an aqueous slurry have typically involved passing the slurry through an appropriate heater, such as a shell-and-tube heat exchanger having horizontal tubes, and conveying the heated effluent to a separator in which phase separation occurs, the supernatant aqueous catalytic reagent being recycled to the process, and the lower liquid sulfur phase being transferred by appropriate means to storage. It was found, however, in such operation that if the concentration of solid sulfur in the suspension exceeded relatively low values, e.g., 5–10%, the solid sulfur had a tendency to plug the tubes of the exchanger. Further, the efficiency of separation in the separating vessel was poor, since the relatively high velocity of the aqueous phase, passing vertically through the separator, had a tendency to entrain small particles of sulfur therein and thus lead to operating difficulties in other sections of the process.

BRIEF DESCRIPTION OF THE INVENTION

In accordance with the invention, sulfur in an aqueous slurry is melted and separated from the aqueous liquid by being passed downwardly through a shell-and-tube heat exchanger having vertically arranged tubes, the effluent liquid mixture being discharged into a first separation zone in which a phase separation between the lighter aqueous phase and the denser liquid sulfur occurs. The upper aqueous phase is then transported to an intermediate point in the height of a vertically elongated second separation zone, while the molten sulfur is transported from the lower end of the first separation zone to a point adjacent the lower end of said second separation zone, in which an interface between the phases is maintained at a point below the entry point of the aqueous liquid phase into the second separation zone. The aqueous liquid is discharged from the top of the second separation zone, while molten sulfur is discharged from the bottom of said second zone.

While the invention is particularly useful in conjunction with processes for removal of hydrogen sulfide from gas streams by treatment with an aqueous catalytic reagent to produce solid sulfur, it is not so limited. The invention can be employed with any slurry of sulfur in an aqueous phase, regardless of the source of the slurry and the nature of any materials dissolved in the aqueous liquid.

The invention will be better understood from the detailed description which follows, taken in conjunction with the accompanying drawings.

BRIEF DESCRIPTION OF THE DRAWING

FIG. 1 is a schematic representation in vertical section of a typical apparatus for carrying out the method of the invention.

DETAILED DESCRIPTION OF A PREFERRED EMBODIMENT

As shown in the drawing, the apparatus of the invention includes a first vessel 10 having in its upper portion a conventional shell-and-tube heat exchanger 11 in which the tubes 12 are maintained in a vertical position between upper tube sheet 13 and lower tube sheet 14. Steam or any other appropriate heating fluid is supplied to the shell side of the exchanger through inlet 16 and condensate is withdrawn through outlet 17.

The interior of first vessel 10 below lower tube sheet 14 is open and functions as a first separation zone 18 for separation of molten sulfur from aqueous liquid.

From a point below lower tube sheet 14, aqueous liquid conduit 19 communicates with a second vessel 20 which functions as a second separator, conduit 19 entering vessel 20 at a point intermediate its top and bottom ends. Sulfur conduit 21 communicates from the bottom of first vessel 10 to a point near the lower end of second vessel 20.

Since it is desired to permit gravity flow between vessels 10 and 20 while maintaining an interphase between aqueous and molten sulfur phases in both vessels, vessels 10 and 20 are fixed at approximately the same elevation. Further, in order to minimize the length of conduits 19 and 21, it is preferred that these conduits be horizontal, although a downward slope from vessel 10 to vessel 20, which would aid in causing molten sulfur to flow into vessel 20, can also be used.

Conduit 22 at the upper end of second vessel 20 allows for the discharge of the aqueous liquid therefrom, while sulfur conduit 23 permits withdrawal of liquid sulfur from the bottom of second vessel 20. In order to maintain sulfur in the molten condition in both vessels 10 and 20, the exterior of first vessel 10 below lower tube sheet 14, both conduits 19 and 21, and the entire exterior of second vessel 20 are equipped with suitable heating means, such as a steam jacket 24 which is provided with steam by means not shown. Since the melting point of sulfur is above the normal boiling point of water, it will be apparent to those skilled in the art that the pressure within the entire system must be maintained sufficiently above atmospheric to prevent boiling of the aqueous liquid. Appropriate means, not shown in the drawing, are provided for this purpose.

In the operation of the apparatus, a slurry of sulfur in an aqueous liquid is supplied to inlet port 26 at the upper end of first vessel 10. In order to minimize the energy requirements of the process, it is generally advisable to concentrate the slurry by conventional means, e.g., settling, before it is introduced into the melter. Accordingly, the slurry entering inlet port 26 may typically contain 15-20% or more, by weight of sulfur. In passing downwardly through tubes 12, the slurry is heated sufficiently to melt the sulfur therein, and the mixture is discharged into first separation zone 18, in which there is maintained an interface 27 between a lower pool 28 of molten sulfur and an upper pool 29 of aqueous liquid.

It will be seen that the vertical orientation of tubes 12 essentially prevents the settling of sulfur particles which might otherwise lead to plugging of the equipment. Further, in dropping vertically through tubes 12, the mixture of aqueous liquid and sulphur gains momentum which is greater for the sulfur than for the aqueous liquid as a result of the greater density of sulfur. Accordingly, in separation zone 18, the difference in momentum aids in the separation, whereby most of the sulfur accumulates in pool 28 and only relatively small amounts remain in suspension in the aqueous phase 29.

The aqueous and sulfur phases 29 and 28 in first vessel 10 are in communication with similar phases in second vessel 20 through conduits 19 and 21 respectively. In second vessel 20, a level controller 31 actuates valve 32 to maintain within the second vessel an interface 33 between the lower molten sulfur and upper aqueous liquid phases 34 and 36 respectively, at a level which is below the entry point of conduit 19 into vessel 20. Because of the communication between the molten sulfur phase 34 in second vessel 20 and molten sulfur pool 28 in first vessel 10, the interfaces 27 and 33 will be approximately at the same vertical level below aqueous conduit 19. Level controller 31 preferably maintains interface 33 at a level such that corresponding interface 27 remains above the bottom of vessel 10. Although the invention can also be practiced with interface 27 positioned within a vertical run 25 of conduit 21 below vessel 10, such operation may cause streams of aqueous liquid 29 and molten sulfur 28 in conduit 25 to move in opposite directions, increasing the possibility of entrainment of one stream in the other, and thus reducing the efficiency of separation which is desired in vessel 10.

The interior volume of second vessel 20 is sufficiently large to permit adequate time for any small particles of sulfur which may be entrained in the stream entering second vessel 20 through aqueous liquid conduit 19 to fall to the bottom of the vessel, where they quickly coalesce with the molten sulfur pool 34 contained therein.

Molten sulfur removed from the bottom of second vessel 20 through conduit 23 is transferred for conventional handling, e.g., to a storage vessel or directly to tank cars. The aqueous liquid leaving through conduit 22 at the upper end of second vessel 20 is treated for regeneration or recovery of any materials dissolved therein, or disposed of, as appropriate.

It will be seen that the method and apparatus of the invention eliminate the deficiencies of the prior art method and apparatus for liquefying and separating sulfur from an aqueous slurry, while facilitating the separation of the molten sulfur from the aqueous phase by gravity.

The foregoing detailed description has been given for clearness of understanding only, and no unnecessary limitations should be understood therefrom as modifications will be obvious to those skilled in the art.

What is claimed is:

1. Apparatus for liquefying and separating sulfur from a slurry thereof in an aqueous liquid, said apparatus comprising:
    a first vessel having an upper and lower end and an upper section and a lower section, said upper section including a shell-and-tube heat exchanger with vertical tubes through which the slurry can be passed downwardly to liquefy the sulfur contained therein, said lower section of said vessel being constructed to act as a gravity separation zone having an upper end wherein separate liquid phases of molten sulfur and aqueous liquid collect;
    a slurry inlet in said first vessel communicating with said upper section;
    a second vessel having an upper and lower end;
    first conduit means for liquid flow communicating from a point adjacent the upper end of said separation zone to an intermediate point in the elevation of said second vessel;
    second conduit means for liquid flow communicating from the lower end of said first vessel to a point adjacent the lower end of said second vessel;
    an aqueous liquid outlet communicating with said second vessel at its upper end; and
    a liquid sulfur outlet communicating with said second vessel at its lower end.

2. Apparatus in accordane with claim 1 further including level control means for maintaining in said second vessel an interface between molten sulfur and aqueous phases in said second vessel at a level below the level of said first conduit means.

3. Apparatus in accordance with claim 1 wherein said gravity separation zone, said first and second conduit means, and said second vessel are provided with means for maintaining the temperature of the sulfur at an elevated temperature above its melting point.

4. Method for separating and recovering sulfur from a slurry thereof in an aqueous liquid comprising the steps of:
    passing said slurry downwardly through a shell-and-tube heat exchanger having vertical tubes, to heat said slurry sufficiently to melt the sulfur contained therein;
    discharging a mixture of aqueous liquid and molten sulfur emerging from said heat exchanger directly into a first separation zone below said heat exchanger;
    permitting said mixture to separate in said separation zone by gravity into two liquid phases consisting of a lower molten sulfur phase and an upper aqueous phase;
    conveying said aqueous phase into a second separation zone at a intermediate point in its elevation;
    conveying said molten sulfur phase into said second separation zone at a point adjacent its lower end;
    maintaining in said second separation zone an interface between an upper aqueous phase and a lower molten sulfur phase at a level below the inlet of said aqueous phase into said second separation zone;
    discharging from the lower end of said second separation zone a stream of molten sulfur; and
    discharging from an upper end of said second separation zone a stream of aqueous liquid.

* * * * *